United States Patent
Lee et al.

(10) Patent No.: US 10,983,525 B2
(45) Date of Patent: Apr. 20, 2021

(54) MOVING ROBOT, CONTROL METHOD FOR MOVING ROBOT, CONTROL SYSTEM FOR MOVING ROBOT

(71) Applicant: LG ELECTRONICS INC., Seoul (KR)

(72) Inventors: Sunghun Lee, Seoul (KR); Junghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 170 days.

(21) Appl. No.: 16/209,033

(22) Filed: Dec. 4, 2018

(65) Prior Publication Data

US 2019/0171217 A1  Jun. 6, 2019

(30) Foreign Application Priority Data

Dec. 4, 2017 (KR) .................. 10-2017-0165377

(51) Int. Cl.
*G05D 1/02* (2020.01)
*G05D 1/00* (2006.01)
(Continued)

(52) U.S. Cl.
CPC ......... *G05D 1/0221* (2013.01); *G05D 1/0088* (2013.01); *G05D 1/0238* (2013.01); *G05D 1/0246* (2013.01); *G05D 1/0287* (2013.01); *G06K 9/00664* (2013.01); *G06K 9/00979* (2013.01); *G06K 9/6215* (2013.01);
(Continued)

(58) Field of Classification Search
CPC .. G05D 1/0221; G05D 1/0238; G05D 1/0088; G05D 1/0246; G05D 1/0287; G05D 2201/0215; G05D 2201/0203; G06K 9/00664; G06K 9/6215; G06K 9/00979; G06N 20/00; G06N 3/008
See application file for complete search history.

(56) References Cited

U.S. PATENT DOCUMENTS 9,632,502 B1 4/2017 Levinson et al.
2018/0133895 A1* 5/2018 Kwak .................. H04W 4/029

FOREIGN PATENT DOCUMENTS

EP 3 159 853 4/2017
KR 10-2013-0027355 3/2013

OTHER PUBLICATIONS

European Office Action dated Jan. 31, 2020 issued in EP Application No. 18210227.7.
(Continued)

*Primary Examiner* — Brian P Sweeney
(74) *Attorney, Agent, or Firm* — Ked & Associates, LLP

(57) ABSTRACT

A method of controlling a moving robot includes a travel control operation in which the moving robot generates field data by sensing information regarding an environment around the moving robot, and controls autonomous traveling based on a recognition result that is obtained by inputting the field data to a recognition algorithm for the moving robot; a server learning operation in which the moving robot transmits at least some of the field data to a server or other device and the server generates update information based on the field data transmitted by the moving robot; and an update operation in which the server transmits the update information to the moving robot, which uses the update information to update the recognition algorithm.

16 Claims, 13 Drawing Sheets

(51) Int. Cl.
    *G06N 20/00*     (2019.01)
    *G06K 9/00*     (2006.01)
    *G06K 9/62*     (2006.01)
    *G06N 3/00*     (2006.01)

(52) U.S. Cl.
    CPC ..... *G06N 20/00* (2019.01); *G05D 2201/0203* (2013.01); *G05D 2201/0215* (2013.01); *G06N 3/008* (2013.01)

(56) References Cited

OTHER PUBLICATIONS

European Search Report dated May 7, 2019 issued in EP Application No. 18210227.7.

\* cited by examiner

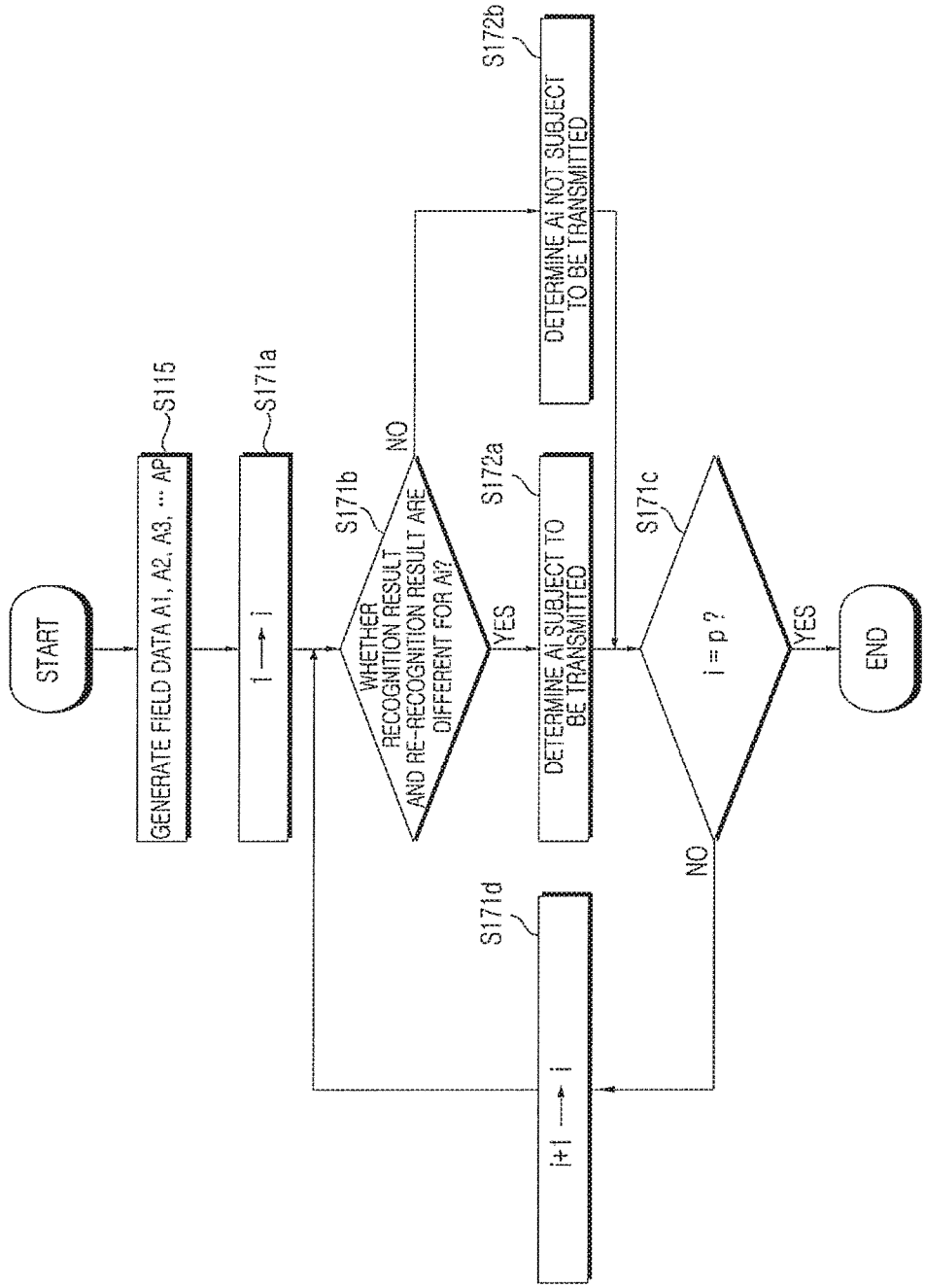

MOVING ROBOT, CONTROL METHOD FOR MOVING ROBOT, CONTROL SYSTEM FOR MOVING ROBOT

CROSS-REFERENCE TO RELATED APPLICATION

This application claims priority under 35 U.S.C. § 119 to Korean Application No. 10-2017-0165377, filed on Dec. 4, 2017 in the Korean Intellectual Property Office, whose entire disclosure is hereby incorporated by reference.

BACKGROUND

1. Field

The present disclosure relates to a moving robot, a control method for the moving robot, and a control system for the moving robot, and more particularly to machine learning using a network between a moving robot and a server.

2. Background

In general, robots have been developed for industrial purposes and have been in charge of part of factory automation. Recently, robot-applied fields have further extended to develop medical robots or aerospace robots, and home robots that may be used in general houses have also been made. Among those robots, a robot capable of driving on its own is a moving robot. The typical example of a moving robot used at home is a robot cleaner.

Such a moving robot may generally include a rechargeable battery and have an obstacle sensor capable of avoiding an obstacle during traveling so that the robot cleaner may perform cleaning while traveling.

Recently, beyond performing cleaning while robot cleaners are simply autonomously traveling in a cleaning area, research into utilization of robot cleaners in various fields such as healthcare, smart home, remote control, and the like, has been actively conducted.

In addition, a moving robot may collect various types of information and process the collected information in various ways using a network.

For example, a camera of a moving robot may capture images around the main body of the moving robot, and a controller of the moving robot may sense information related to any obstacle in captured image.

Regarding this, Korean Patent Publication No. 10-2013-0027355 (Published on Mar. 15, 2013) discloses a remote control method of a robot cleaner, the method by which a terminal device and the robot cleaner are connected over a network so as to control the robot cleaner in various ways.

However, in a robot cleaner system disclosed in the aforementioned Korean Patent Publication No. 10-2013-0027355, the robot cleaner does not utilize a machine learning to detect a nearby obstacle, thereby making it difficult to detect an obstacle accurately.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 13 is a detailed flowchart of how to select a field data item subject to be transmitted according to comparison between a recognition result and a re-recognition result in FIG. 11.

DETAILED DESCRIPTION

Hereinafter, terms such as "first", "second", and "third" are used herein for purposes of description and are not intended to indicate or imply relative sequence, importance, or significance. For example, the present disclosure may include only a second element without a first element.

A moving robot (for autonomous cleaner) 100 according to the present disclosure refers to a robot capable of moving on its own using a wheel or the like, and the moving robot 100 may include a house keeper robot, robot cleaner, etc. Hereinafter, the moving robot 100a is described as an example with reference to FIGS. 1 to 4, but aspects of the present disclosure is not necessarily limited thereto.

Figure 1:
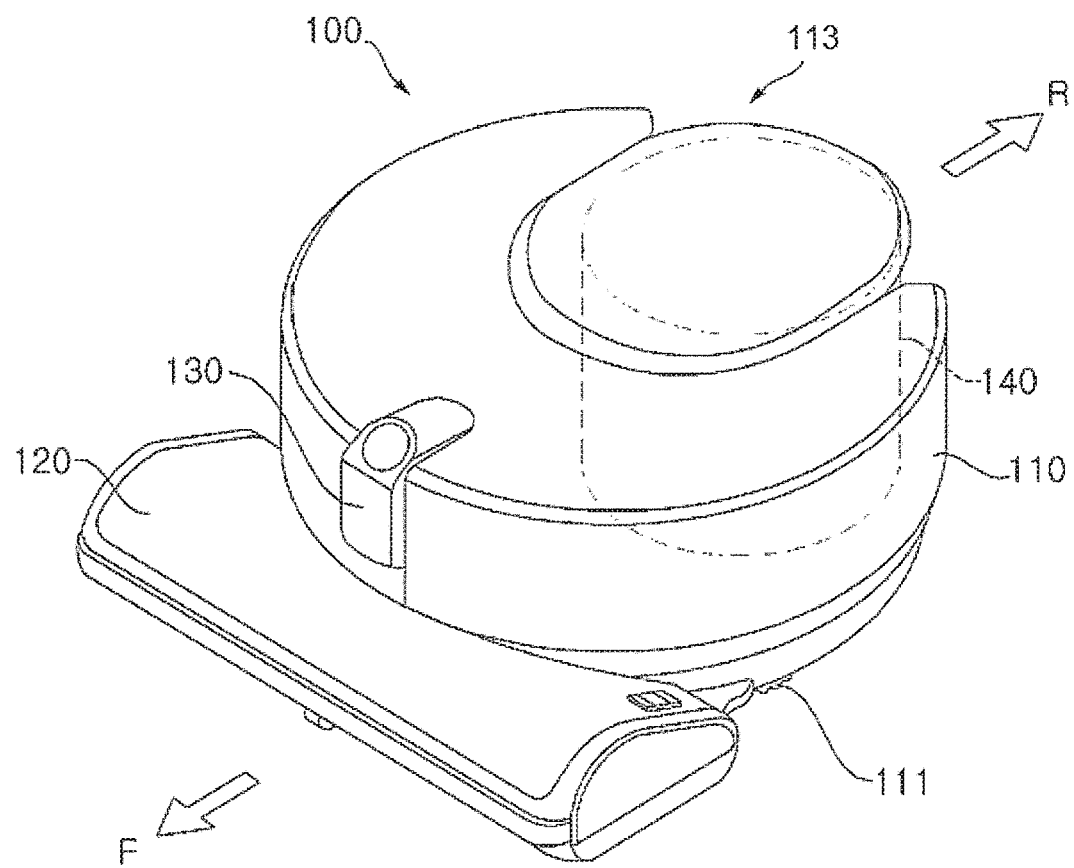
FIG. 1 is a perspective view of a moving robot according to an embodiment of the present disclosure.
Figure 2:
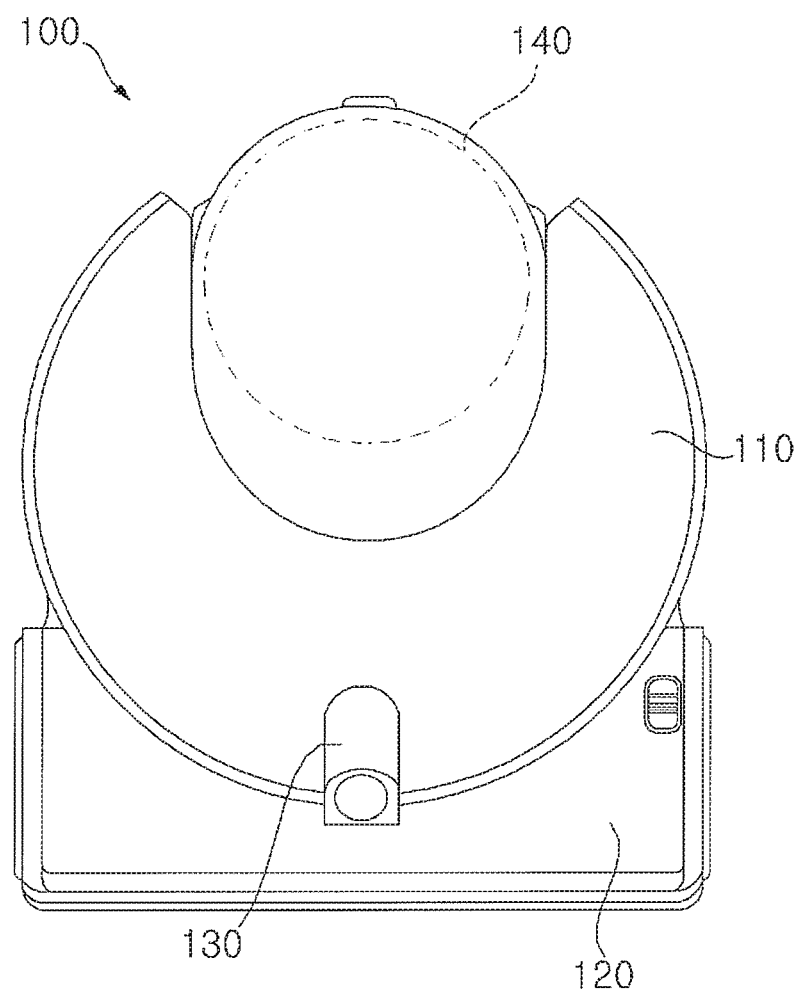
FIG. 2 is a plan view of the moving robot of FIG. 1.
Figure 3:
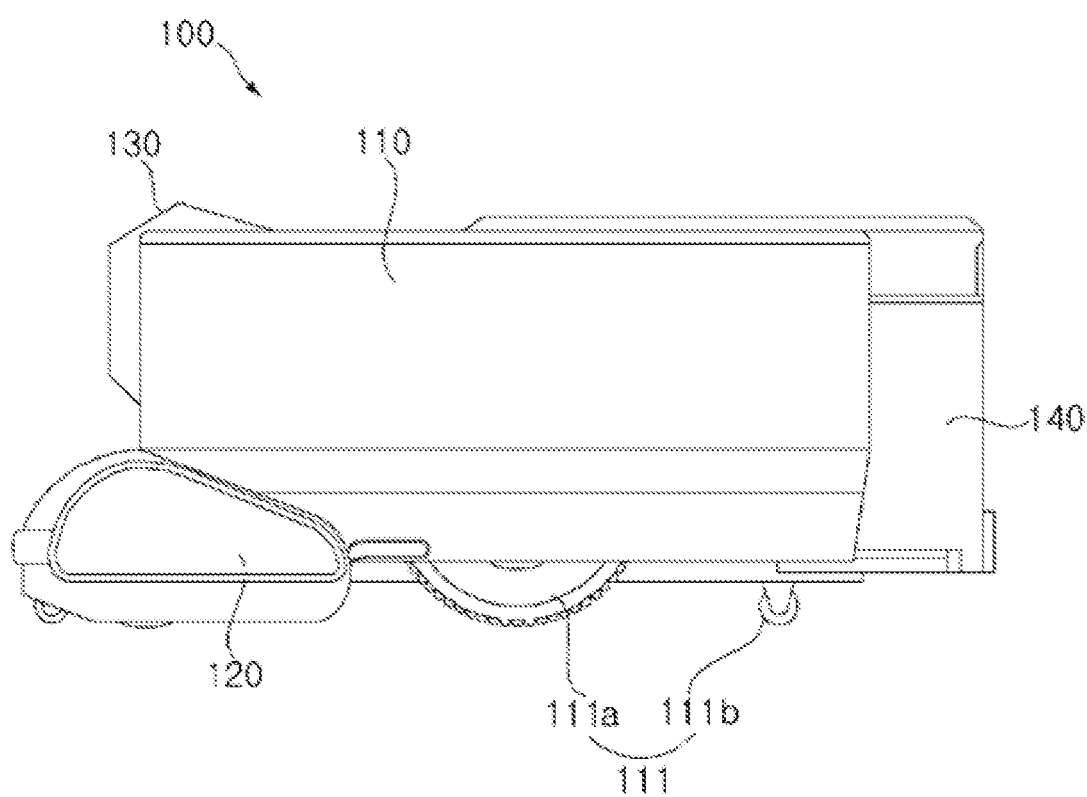
FIG. 3 is a side view of the moving robot of FIG. 1.

Referring to FIGS. 1 to 3, the mobile terminal 100 may autonomously travel over a specific region. The moving robot 100 may perform a floor cleaning function. Cleaning a floor includes suctioning dusts (including foreign substances) from the floor and mopping the floor.

The moving robot 100 includes a main body 110. The main body 110 includes a cabinet that defines the exterior appearance of the moving robot 100. The moving robot 100 may include a suction unit (or suction head) 120 and a dust container 140 provided in the main body 110. The moving robot 100 includes a sensing unit (or sensor) 130 for sensing information about an environment around the moving robot 100. The moving robot 100 includes a driving unit (or motor) 150 for moving the main body 110. The moving robot 100 includes a controller 181 for controlling the moving robot 100. The controller 181 is provided in the main body 110.

The driving unit 150 includes a wheel unit (or wheels) 111 for helping the moving robot 100 to travel. The wheel unit 111 is provided in the main body 110. The moving robot 100 may move forward, rearward, leftward, or rightward, or rotate by the wheel unit 111. As the controller 181 controls driving of the wheel unit 111, the moving robot 100 may autonomously travel on a floor. The wheel unit 111 includes a main wheel 111a and a sub-wheel 111b.

The main wheel 111a is provided on both sides of the main body 110 to be rotatable in one direction or the other direction in accordance with a control signal from the controller 181. Each main wheel 111a may operate independently. For example, each main wheel 111a may operate by a different motor.

The sub-wheel 111b supports the main body 110 together with the main wheel 111a so as to assist traveling of the moving robot 100 driven by the main wheels 111a. The sub-wheel 111b may be also provided in the suction unit 120 which will be described later on.

The suction unit 120 may be disposed protruding from the front (F) of the main body 110. The suction unit 120 is provided to suction air which contains dusts. The suction unit 120 may protrude from the left and right sides of the front of the main body 110. The front end of the suction unit 120 may be spaced apart forward of one side of the main body 110. The left and right ends of the suction unit 120 may be spaced apart leftward and rightward, respectively, from the left and right sides of the main body 110.

The main body 110 may have a circular shape, and the both sides of the rear end of the suction unit 120 may protrude leftward and rightward, respectively, from the main body 110, and therefore, there may be an empty space, that is, a gap, between the main body 110 and the suction unit 120. The empty space is a space between the left and right ends of the main body 110 and the left and right ends of the suction unit 120, and the empty space has a shape recessed inward of the moving robot 100.

The suction unit 120 may be detachably coupled to the main body 110. If the suction unit 120 is detached from the main body 110, a mopping module (not shown) instead of the suction unit 120 may be detachably coupled to the main body 110.

The sensing unit 130 may be disposed in the main body 110. The sensing unit 130 may be disposed at the front of the main body 110. The sensing unit 130 may be disposed to overlap the suction unit 120 in an upward-downward direction of the main body 110. The sensing unit 130 may be disposed above the suction unit 120.

The sensing unit 130 may sense an obstacle around the moving robot 110. The sensing unit 130 may sense an obstacle or a geographical feature located in front of the moving robot 100 so that the suction unit 120 disposed at the front of the moving robot 100 does not collide with any obstacle. In addition to this sensing function, the sensing unit 130 may perform other sensing functions which will be described later on.

The main body 110 may include a dust container accommodator 113. A dust container 140 for collecting dusts out of suctioned air is detachably coupled to the dust container accommodator 113. The dust container accommodator 113 may be formed at the rear (R) of the main body 110. Part of the dust container 140 may be accommodated in the dust container accommodator 113, whereas the rest thereof may protrude rearward of the main body 110.

An air inlet (not shown) through which air including dust inflows, and an air outlet (not shown) through which dust-separated air is discharged are formed on the dust container 140. When the dust container 140 is mounted into the dust container accommodator 113, the air inlet and the air outlet of the dust container 140 may communicate with a first opening (not shown) and a second opening (not shown) which are formed an inner sidewall of the dust container accommodator 113.

There is provided an absorption path along which air is guided from an absorption opening of suction unit 120 toward the first opening. There is provided a discharge path along which air is guided from the second opening toward an exhaust port (not shown).

Dust-filled air taken in through the suction unit 120 flows into the dust container 140 along the absorption path formed inside the main body 110, and air and dusts are separated while the dust-contained air passes through a filter or a cyclone of the dust container 140. The dusts are collected by the dust container 140, and the air is discharged from the dust container 140, passes through the discharge path formed inside of the main body 110, and is then discharged to the outside through the exhaust port.

Figure 4:
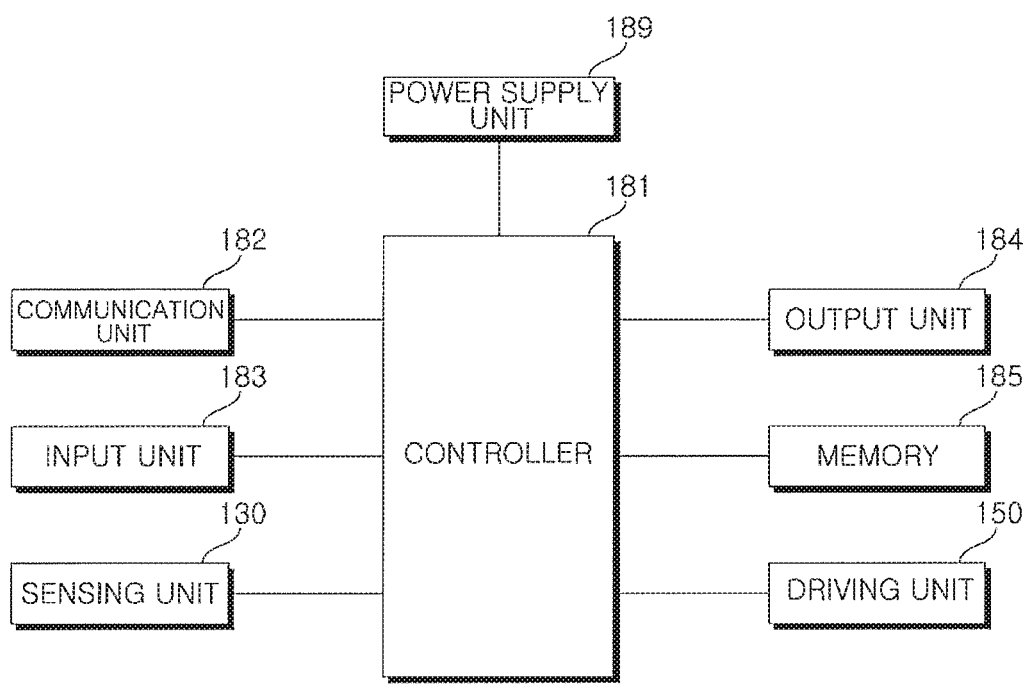
FIG. 4 is a control block diagram of the moving robot of FIG. 1.

Referring to FIG. 4, the moving robot 100 includes a communication unit (or communication interface) 182 for performing communication over a predetermined network 50. The moving robot 100 includes an input unit (or input device) 183 for receiving various commands from a user. The moving robot 100 includes an output unit (or output device) 184 that outputs various types of information to the user. The moving robot 100 includes a memory 185 for storing information.

The moving robot 100 includes a power supply unit (or power supply) 189 that supplies power. The power supply unit 189 supplies driving power to each component of the moving robot 100. The power supply unit 189 may supply operation power required for the moving robot 100 to travel or perform a specific function. The power supply unit 189 may include a battery (not shown) mounted in the main body 110. The battery may be rechargeable. The battery is rechargeable by external commercial power source. The battery may be detachably attached to the bottom of the main body 110.

The controller 181 may sense remaining power capacity of the battery, and, if the remaining power capacity is insufficient, the controller 181 may control the moving robot 100 to move to a charging station (not shown) connected to the external commercial power source. An output unit 184 may display the remaining battery capacity on a screen by the control unit 181.

The driving unit 150 may include a motor and operate the motor so as to rotate left and right main wheels in both directions to rotate or move the main body 110. The driving unit 150 may move the main body 110 of the moving robot 100 forwards, backwards, leftwards, and rightwards, or enable the main body 110 of the moving robot 100 to travel in a curved manner or rotate in place.

The input unit 183 receives various control commands regarding a robot cleaner from a user. The input unit 183 may include a button, a dial, a touch screen, etc. The input unit 183 may include a microphone for receiving a user's voice command.

The output unit 184 may output various types of information in a visual or audible form. The output unit 184 may include a display. For example, a battery state or a traveling scheme may be displayed on the display. The output unit 184 may include a speaker that outputs sound or voice.

In one example, the moving robot 100 may output environment information regarding a traveling region on a screen or output the same as sound through the output unit 184. In another example, the output unit 184 may transmit specific information to a terminal device over a specific network 50 so that the terminal device outputs visual information or audible information.

The sensing unit 130 senses information regarding an environment around the main body 110 during traveling. The sensing unit 130 senses information regarding the environment so as to generate field data.

The sensing unit 130 may include at least one of the following: an external signal sensor, an obstacle sensor, a cliff sensor, a lower camera sensor, an upper camera sensor, a three-dimensional (3D) camera sensor, an encoder, an impact sensor, and a microphone.

Figure 6:
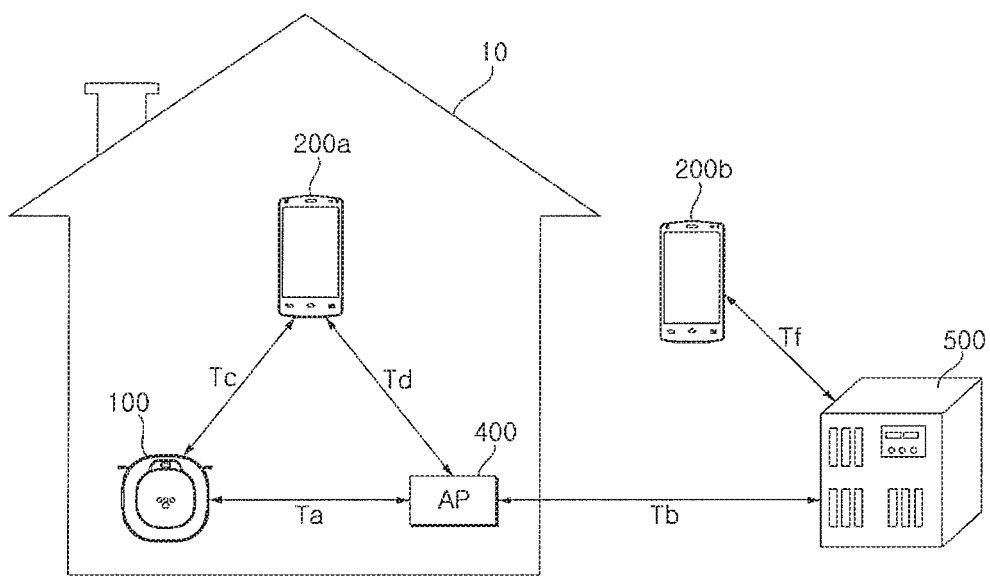
FIG. 6 is a conceptual diagram illustrating an example of the network of FIG. 5.

The external signal sensor may sense an external signal of a mobile terminal 200 (see FIG. 6). The external signal sensor may be an infrared ray sensor, an ultrasonic sensor, a Radio Frequency (RF) sensor, etc. Accordingly, field data of an external signal may be generated.

The moving robot 100 may sense a location and a direction of a charging station by receiving a guidance signal, which is generated by the charging station, using the external signal sensor. In this case, the charging station may transmit a guidance signal indicative of a direction and a distance so as to enable the mobile terminal 100 to return. That is, by receiving a signal transmitted by the charging station, the mobile terminal 100 may determine the current location and setting a direction of movement so as to return back to the charging station.

The obstacle sensor may be installed at the front of the moving robot 100. The obstacle sensor senses an obstacle in front of the moving robot 100. Accordingly, field data of the obstacle is generated.

The obstacle sensor may transmit, to the controller 181, field data which is generated as a result of sensing of an obstacle existing in a direction of travel of the moving robot 100. That is, the obstacle sensor may sense a protrusion existing in a movement path of the moving robot, furnishings, furniture, a wall surface, a wall corner, or the like, in a house, and then transmit field data of a sensed object to the controller 181.

The obstacle sensor may be, for example, an infrared sensor, an ultrasonic sensor, an RF sensor, a geomagnetic sensor, etc. The moving robot 100 may use only one type or two or more types of obstacle sensors, if necessary.

The cliff sensor uses various forms of an optical sensor to sense an obstacle existing on a floor which supports the main body 110 of the moving robot 100. Accordingly, field data of an obstacle underneath the bottom of the main body 110 is generated.

The cliff sensor may be installed on a rear surface of the moving robot 100. The cliff sensor may sense an obstacle existing on the floor. Similarly to the obstacle sensor, the cliff sensor may be an infrared sensor including a light emitting unit and a light receiving unit, an ultrasonic sensor, an RF signal, a position sensitive detector (PSD) sensor, etc.

For example, the cliff sensor may be a PSD sensor but may include a plurality of different types of sensors. The PSD sensor may include a light emitting unit for emitting infrared light to an obstacle, and a light receiving unit for receiving infrared light returned after being reflected from the obstacle. In general, the PSD sensor may be a module. In the case where an obstacle is sensed using the PSD sensor, a stable measurement value may be obtained regardless of difference in reflectivity or color of the obstacle.

The controller 181 may measure an angle between an infrared emission signal emitted by the cliff sensor toward the floor and a reflection signal received as a result of reflection from the obstacle to sense a cliff and obtain field data of a depth thereof.

The lower camera sensor may be provided on a rear surface of the moving robot 100. The lower camera sensor obtains image information (field data) regarding a floor during movement. The lower camera sensor may be also called an optical flow sensor. The lower camera sensor may convert an image of a lower side input from an image sensor provided therein so as to generate a predetermined format of image data (field data). Field data of an image recognized using the lower camera sensor may be generated.

Using the lower camera sensor, the controller 181 may detect a position of the moving robot 100, regardless of whether or not the moving robot 100 slides. The controller 180 may compare and analyze image data captured by the lower camera sensor over time to calculate a movement distance and a movement direction, and calculate a position of the moving robot 100 on the basis of the calculated movement distance and the movement direction.

The upper camera sensor may be installed to face an upper side or a front side of the moving robot 100 to capture images around the moving robot. When the moving robot 100 includes a plurality of camera sensors, the camera sensors may be formed at or in an upper portion or on a side surface of the moving robot at a predetermined distance or at a predetermined angle. Field data of an image recognized using the upper camera sensor may be generated.

The 3D camera sensor may be attached to one surface or a portion of the main body of the moving robot to generate 3D coordinate information regarding the surroundings of the main body. That is, the 3D camera sensor may be a 3D depth camera that calculates a distance between the moving robot 100 and a subject. Accordingly, field data of the 3D coordinate information may be generated.

Specifically, the 3D camera sensor may capture a three-dimensional (2D) image around the main body, and generate a plurality of sets of 3D coordinate information corresponding to the captured 2D image. The 3D camera sensor according to one embodiment of the present disclosure may include two or more existing cameras each capable of acquiring a 2D image, and may be formed in stereo vision to combine two or more acquired images and generate 3D coordinate information.

Specifically, the 3D camera sensor according to the aforementioned embodiment of the present disclosure may include a first pattern irradiation unit for irradiating light of a first pattern downward toward the front side of the main body, a second pattern irradiation unit for irradiating light of a second pattern upward toward the front side of the main body, and an image acquisition unit for acquiring an image of a region forward of the main body. Accordingly, the image acquisition unit may acquire an image of a region on which the light of the first pattern and the light of the second pattern are incident.

A third camera sensor according to another embodiment of the present disclosure may include an infrared pattern projection unit for projecting an infrared pattern together with a single camera, and may capture a shape of an infrared pattern projected onto a subject to measure a distance between the 3D camera sensor and the subject. Such a 3D camera sensor may be a 3D Infra-Red (IR) camera sensor.

A third camera sensor according to yet another embodiment of the present disclosure may include a light emitting unit for emitting light together with a single camera, and may receive part of light reflected from a subject and analyze a received laser to measure a distance between the 3D camera sensor and the subject. Such a 3D camera sensor may be a 3D Time-of-Flight (TOF) camera sensor.

Specifically, a laser in the 3D camera sensor is configured to irradiate a laser beam extending in at least one direction. In one example, the 3D camera sensor may include a first laser for irradiating laser beams intersecting each other, and a second laser for irradiating a single straight laser beam. Accordingly, a bottom laser is used to sense an obstacle of the floor, a top layer is used to sense an obstacle on the top, and a middle laser is used to sense an obstacle between the bottom laser and the top laser.

An encoder (not shown) may sense information regarding operation of a motor for operating wheels of the driving unit 150. Accordingly, field data of motor operation is generated.

The impact sensor may sense an impact when the moving robot 100 collides with an external obstacle. Accordingly, field data of an external impact is generated.

A microphone may sense external sound. Accordingly, field data of the external sound is generated.

In one embodiment, the sensing unit 130 includes an image sensor. In this embodiment, the field data is image information acquired by the image sensor or feature information extracted from the image information, but it is not necessarily limited thereto.

Meanwhile, the memory 185 stores a control program for controlling or driving a robot cleaner, and data corresponding thereto. The memory 185 may store audio information, image information, obstacle information, position information, map information, and the like. In addition, the memory 185 may store information related to a traveling pattern.

The memory 185 of the moving robot 100 may store information received through the communication unit 182 over the network 50. The memory 185 may store a command input through the input unit 183.

The memory 185 may store information acquired from the sensing unit 130 (e.g., field data). The memory 185 stores the field data. The memory 185 may store the field data temporarily, and delete the stored field data under a predetermined condition.

The memory 185 may store a recognition algorithm which will be described later on. The memory 185 may store a re-recognition algorithm which will be described later on. The memory 185 may store update information which will be described later on.

The memory 185 may include a non-volatile memory. The non-volatile memory (NVM)(or NVRAM) is a storage device capable of continuously maintaining stored information even though power is not applied thereto. For example, the memory 185 may be a ROM, a flash memory, a magnetic computer storage device (e.g., a hard disk or a magnetic tape), an optical disk drive, a magnetic RAM, a PRAM, etc.

Meanwhile, the communication unit 182 may be connected to a terminal device and/or a different device positioned within a specific region via wired, wireless, or satellite communication so as to transmit and receive data. The communication unit 182 may communicate with a different device positioned in the specific region. The communication unit 182 may communicate with a wireless router (or access point (AP)) 400. The communication unit 182 may communicate with a mobile terminal (or user device) 200. The communication unit 182 may communicate with a server (or computer) 500.

Referring to Ta in FIG. 6, the communication unit 182 of the moving robot 100 may wirelessly communicate with the wireless router 400. Referring to Tc in FIG. 6, the communication unit 182 may wirelessly communicate with a mobile terminal 200a. Although not illustrated in the drawings, the communication unit 182 may wirelessly communicate directly with the server 500. For example, the communication unit 182 may wirelessly communicate using a wireless communication technology such as IEEE 802.11 WLAN, IEEE 802.15 WPAN, UWB, Wi-Fi, Zigbee, Z-wave, Blue-Tooth, and the like. The communication unit 182 may vary depending on a type of the different device to communicate or a communication scheme of the server.

The moving robot 100 may transmit information, acquired from the input unit 183 through the communication unit 182, to a network. The moving robot 100 may transmit information (field data), acquired from the sensing unit 130 through the communication unit 182, to a network. The current operation state of the moving robot 100 may be transmitted through the communication unit 182 to a network.

The moving robot 100 may receive information through the communication unit 182 over the network, and the moving robot 100 may be controlled based on the received information. Based on the information (e.g., update information) received through the communication unit 182 over the network, the moving robot 100 may update an algorithm (e.g., a recognition algorithm and/or a re-recognition algorithm) necessary to control traveling.

Figure 5:
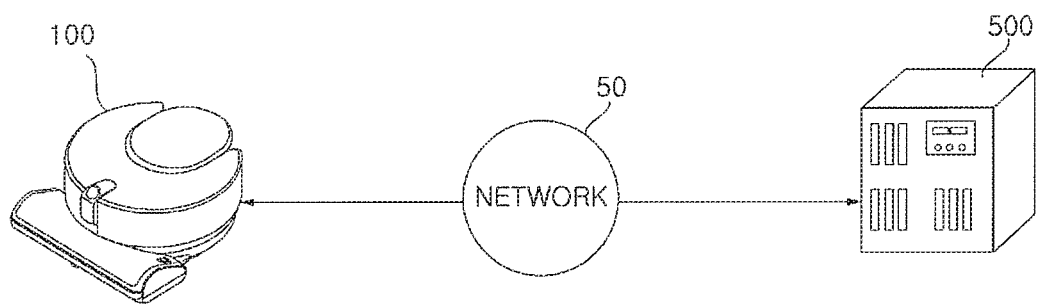
FIG. 5 is a conceptual diagram illustrating a network 50 for the moving robot of FIG. 1 and a server.

Referring to FIG. 5, the moving robot 100 communicates with the server 500 over a specific network 50. The communication unit 182 may communicate with the server 500 over the specific network. The specific network is a communication network that is directly or indirectly connected via wired and/or wireless service. The fact that "the communication unit 182 communicates with the server 500 over a specific network" includes not just the case where the communication unit 182 and the server 500 communicate directly with each other, but also the case where the communication unit 182 and the server 500 communicate indirectly with each other via the wireless router 400 or the like. Such a network may be established based on technologies such as Wi-Fi, Ethernet, Zigbee, Z-Wave, Bluetooth, etc.

The communication unit 182 may transmit field data to the server over the specific network. The server 500 may transmit update information, which will be described later on, to the communication unit 182 over the specific network.

FIG. 6 is a conceptual diagram illustrating an example of the specific network. The moving robot 100, the wireless router 400, the server 500, and mobile terminals 200a and 200b may be connected over the network to receive and transmit data. Among them, the moving robot 100, the wireless router 400, and the mobile terminal 200a may be positioned in a building 10 such as a house. The server 500 may be implemented inside the building 10, but may be a broad-range network that is implemented outside the building 10.

The wireless router 400 and the server may include a communication module able to access the network according to a predetermined protocol. The communication unit 182 of the moving robot 100 is provided to access the network according to the predetermined protocol.

The moving robot 100 may exchange data with the server 500 over the network. The communication unit 182 may exchange data with the wireless router 400 via wired or wireless communication, thereby exchanging data with the server 500. In this embodiment, the moving robot 100 and the server 500 communicate with each other through the wireless router 400 (see Ta and Tb in FIG. 6), but aspects of the present disclosure is not necessarily limited thereto.

Referring to Ta in FIG. 6, the wireless router 400 may be wireless-connected to the moving robot 100. Referring to Tb in FIG. 6, the wireless router 400 may be wired- or wireless-connected to the server 500. Through Td in FIG. 6, the wireless router 400 may be wireless-connected to the mobile terminal 200*a*.

Meanwhile, the wireless router 400 may allocate wireless channels to electronic devices located in a specific region according to a specific communication scheme, and perform wireless data communication using the wireless channels. The specific communication scheme may be a Wi-Fi communication scheme.

The wireless router 400 may communicate with the moving robot 100 located within a specific region. The wireless router 400 may communicate with the mobile terminal 200*a* positioned within the specific region. The wireless router 400 may communicate with the server 500.

The server 500 may be accessible on the Internet or other wide area network. It is possible to communicate with the server 500 using any of various mobile terminals 200*b* currently accessing the Internet. The mobile terminals 200*b* may be a personal computer (PC) or a smart phone. The server 500 communicates with the mobile terminal over the specific network.

Referring to Tb in FIG. 6, the server 500 may be wired- or wireless-connected to the wireless router 400. Referring to Tf in FIG. 6, the server 500 may be wireless-connected directly to the mobile terminal 200*b*. Although not illustrated in the drawings, the server 500 may communicate directly with the moving robot 100.

The server 500 includes a processor capable of processing a program. Functions of the server 500 may be performed by a central computer (Cloud) or by a user's computer or mobile terminal.

In one example, the server 500 may be a server administered by a manufacturer of the mobile terminal 100. In another example, the server 500 may be a server administered by an application store operator who is made public. In yet another example, the server 500 may be a home server that is provided at home, stores state information about home appliances at home, and contents shared between the home appliances.

The server 500 may store firmware information about the moving robot 100 and driving information (e.g., course information), and store product information of the moving robot 100.

The server 500 may perform machine learning. The server 500 may perform data mining. The server 500 may perform learning on field data. Based on the field data, the server 500 may generate update information which will be described later on.

Referring to Td in FIG. 6, the mobile terminal 200*a* may be wireless-connected to the wireless router 400 via Wi-Fi or the like. Referring to Tc in FIG. 6, the mobile terminal 200*a* may be wireless-connected directly to the moving robot 100 via Bluetooth or the like. Referring to Tf in FIG. 6, the mobile terminal 200*b* may be wireless-connected directly to the server 500.

The network may further include a gateway (not shown). The gateway may use the medium of communication between the moving robot 110 and the wireless router 400. The gateway may wirelessly communicate with the moving robot 100. The gateway may communicate with the wireless router 400. For example, communication between the gateway and the wireless router 400 may be based on Ethernet or Wi-Fi.

Several terms used in this specification are defined as below. A "recognition algorithm" may be an algorithm for determination or recognition based on information sensed by the sensing unit 130 in order to travel autonomously. The recognition algorithm is an algorithm that outputs an outcome value when an input value is input. The recognition algorithm is provided to recognize a situation of the moving robot 100. The recognition algorithm is installed in the moving robot 100. The recognition algorithm may be a subject to update.

"Field Data" may be the input value for the recognition algorithm. "Value" in the input value is not necessarily numeric information. The field data may be information sensed by the sensing unit 130, or information obtained after a specific processing of the information sensed by the sensing unit 130. The field data may be an input value for a re-recognition algorithm which will be described later on. A plurality of field data items may be generated, and, in this case, the plurality of field data items may be distinguished on a unit basis of input value that is to be input to the recognition algorithm. For example, the field data may be data of an obstacle sensed by the moving robot 100.

A "recognition result" may be the outcome value of the recognition algorithm. "Value" in the outcome value is not necessarily numeric information. The recognition result is determined by the recognition algorithm based on field data. For example, the recognition result may be object classification information used for object recognition.

"Actual value" may be an outcome determined by an operator or a highly precise super algorithm based on an input value (field data). The actual value is data that can be compared with the recognition result. For example, when the recognition result is object classification information used for object recognition, the actual value comparable with the recognition result is also object classification information. The better the performance of the recognition algorithm the more likely the recognition result obtained from the same field data is to be the same as the actual value. The recognition algorithm may be updated to enhance the likelihood that the field data is the same as the actual value.

Figure 12:
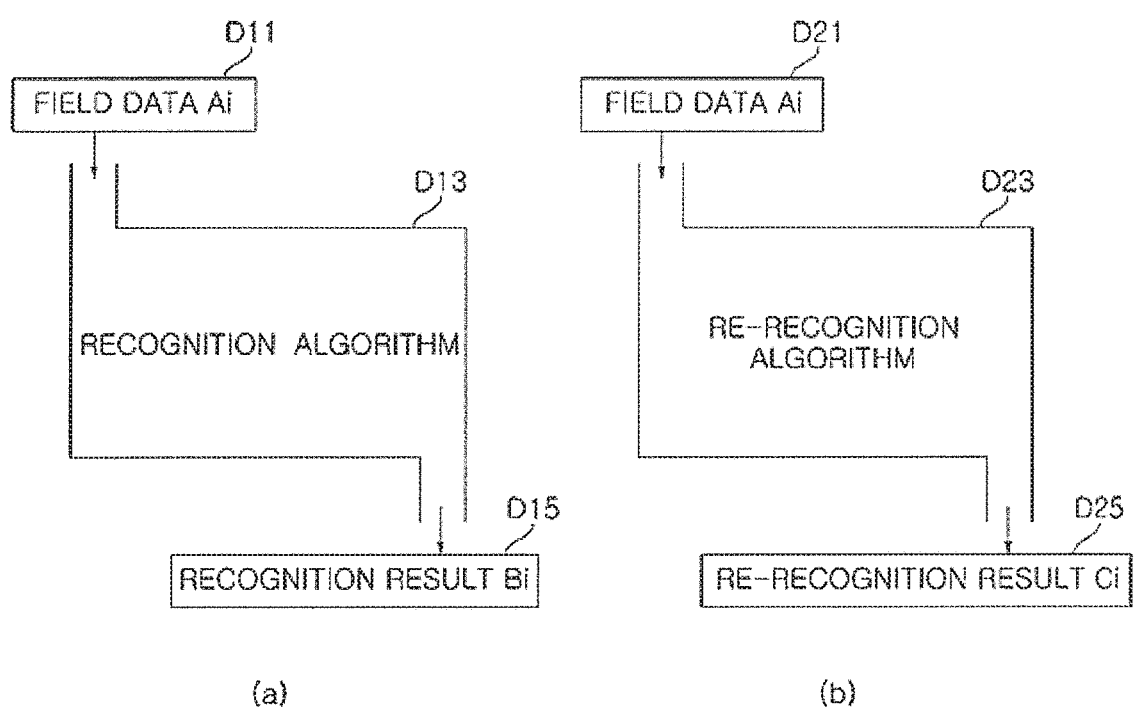
FIG. 12 is a conceptual diagram illustrating a recognition algorithm and a re-recognition algorithm of FIG. 11.

The controller 181 may obtain a recognition result by inputting the field data to a specific recognition algorithm (see FIG. 12(*a*)). In one example, the field data may be image information acquired an image sensor or feature information extracted from an image (e.g., a plurality of descriptors), and the recognition result may be a type of a subject in a captured image.

In another example, the field data may be information acquired using the obstacle sensor or information converted from the acquired information, and the recognition result may be a type of a sensed obstacle. In yet another example, the field data may be information regarding difference between a plurality of images captured by the image sensor, and the recognition result may be a type of a subject or an object in a captured image. In yet another example, the field data is information related to sound that is sensed using the microphone, and the recognition result may be a user's position or information about whether the user exists.

The controller 181 may recognize a response-needed situation through sensing by the sensing unit 130. The response-needed situation is a situation in which the moving robot 100 needs to select any one from a plurality of driving modes, motions, and/or functions.

In one example, when it is determined, based on a sensing result of the sensing unit 130, that an obstacle exists on a path of travel of the moving robot 100, the controller 181 may recognize a response-needed situation. In another example, when it is determined, based on a sensing result of the sensing unit 130, that the wheel 111*a* of the driving unit 150 is restricted, the controller 181 may recognize a response-needed situation.

In yet another example, when it is determined, based on a sensing result of the sensing unit 130, that the wheel 111a of the driving unit 150 is idle running, the controller 181 may recognize a response-needed situation. In yet another example, when it is determined, based on a sensing result of the sensing unit 130, that a point in the main body 110 is spaced apart a predetermined distance or more from the floor of a traveling region, the controller 181 may recognize a response-needed situation.

In yet another example, when it is determined that the main body 110 is out of a path of travel, the controller 181 may recognize a response-needed situation. In yet another example, when it is determined that the moving robot 100 has failed to escape from a specific region (e.g., underneath a bed or a narrow region) for a specific time period or more, the controller 181 may recognize a response-needed situation.

In yet another example, when it is determined, based on a sensing result of the sensing unit 130, that a significant difference is detected between a plurality of images captured for a predetermined period of time while the moving robot 100 is stopped, the controller 181 may recognize a response-needed situation. In yet another example, when it is determined, based on a sensing result of the sensing unit 130, that sound occurs around the main body 110, the controller 181 may recognize a response-needed situation.

In the response-needed situation, filter data Ai may be generated based on information sensed by the sensing unit 130; a recognition result Bi may be obtained by inputting the filter data Ai to the recognition algorithm; and one from a plurality of driving modes, motions, and functions may be selected based on the recognition result Bi. For example, based on the recognition result, the controller 181 may control the moving robot 100 to perform an obstacle avoidance motion.

Examples of control (selecting a driving mode, motion, function, etc.) of the moving robot 100 based on a recognition result in the response-needed situation are as below. The controller 181 may control the driving unit 150 according to a selected driving mode or motion.

In one example, when it is determined, based on a recognition result, that an obstacle (e.g., furniture or a wall) belonging to a specific first group exists on a path of travel of the moving robot 100, the controller 181 may select a first driving mode to avoid the obstacle. In another example, when it is determined, based on a recognition result, that an obstacle (e.g., a user or a pet) belonging to a specific second group exists on a path of travel of the moving robot 100, the controller 181 may select a second driving mode to temporarily stop operation of the moving robot 100.

In yet another example, when it is determined, based on a recognition result, that driving of the moving robot 100 is disrupted, the controller 181 may set a second driving mode to temporarily stop operation of the moving robot 100. In yet another example, based on a recognition result, the controller 181 may transmit an image captured in a traveling region to a pre-registered mobile terminal.

In yet another example, based on a recognition result obtained by inputting field data of difference between a plurality of captured images to the recognition algorithm, the controller 181 may provide monitoring information of a traveling region, where the moving robot 100 is located, to a user of the moving robot 100.

In yet another example, when it is determined, based on a recognition result, an obstacle (e.g., an object or a living thing that threatens security) belonging to a specific third group exists on a path of travel of the moving robot 100, the controller 181 may select a third driving mode so that the moving robot 100 performs a security warning function.

In yet another example, when it is determined, based on a recognition result obtained by inputting field data of sensed sound to the recognition algorithm, that there is an object or a living thing threatening security of a traveling region where the moving robot 100 is located, the controller 181 may select the third driving mode so that the moving robot 100 performs a security warning function.

In yet another example, when it is determined, based on a recognition result, that an obstacle (e.g., a threshold equal to or less than a specific height) belonging to a specific fourth group exists on a path of travel of the moving robot 100, the controller 181 may select a fourth driving mode so that the moving robot 100 goes over the obstacle.

Hereinafter, a control method of a moving robot and a control system of a moving robot according to embodiments of the present disclosure will be described with reference to FIGS. 6 to 13. The control method may be performed by at least one of the controller 181 and the server 500. The present disclosure may be a computer program for implementing each process of the control method or may be a storage medium which stores a program for implementing the control method. The "record medium" indicates a computer readable record medium. The present disclosure may be a control system including both hardware and software.

In some embodiments, functions for processes may be implemented in a sequence different from mentioned herein. For example, two consecutive processes may be performed at the same time or may be performed in an inverse sequence depending on a corresponding function.

The control method includes a travel control operation in which the moving robot 100 controls autonomous traveling based on a recognition result that is obtained by inputting the field data to a recognition algorithm stored in the moving robot 100. In the travel control operation, information regarding an environment around the moving robot 100 is sensed during traveling of the moving robot 100 to generate the field data. The control method includes a server learning operation in which the server 500 generates update information based on the field data received from the moving robot 100. In the server learning operation, the moving robot 100 transmits at least some of the field data to the server 500. The control method includes an update operation in which the moving robot 100 updates the recognition algorithm using the update information received from the server 500. In the update operation, the server 500 transmits the update information to the moving robot 100.

Figure 7:
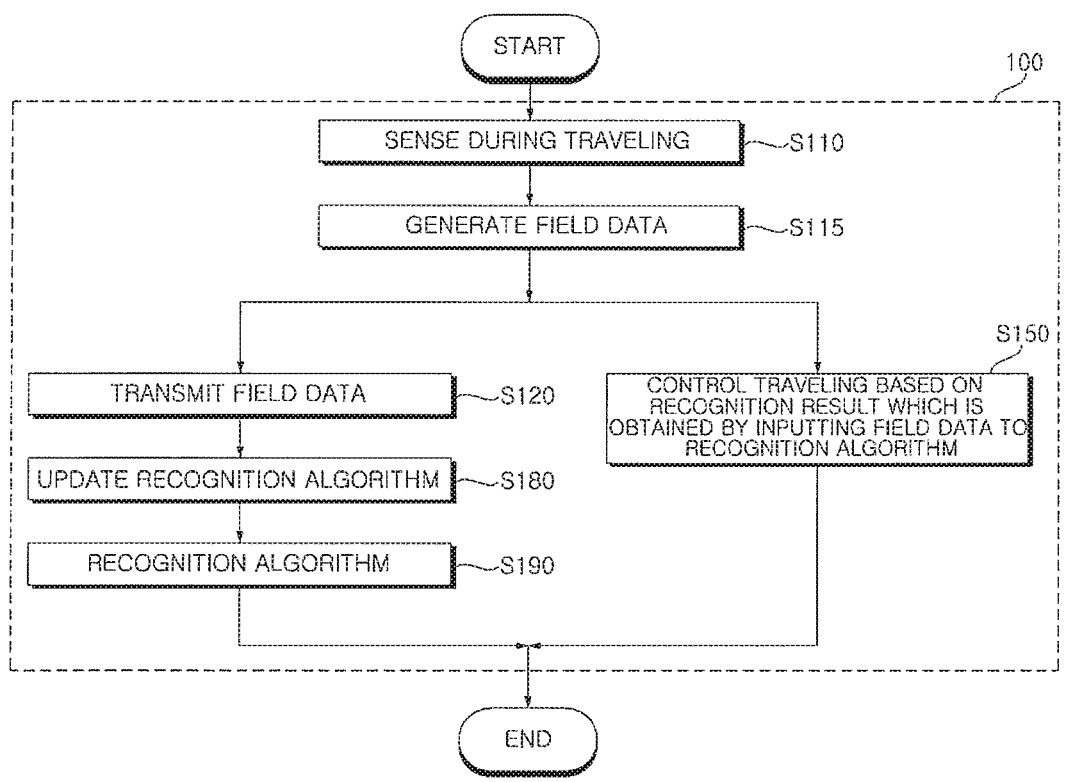
FIG. 7 is a flowchart illustrating a control method of a moving robot according to a first embodiment of the present disclosure.
Figure 9:
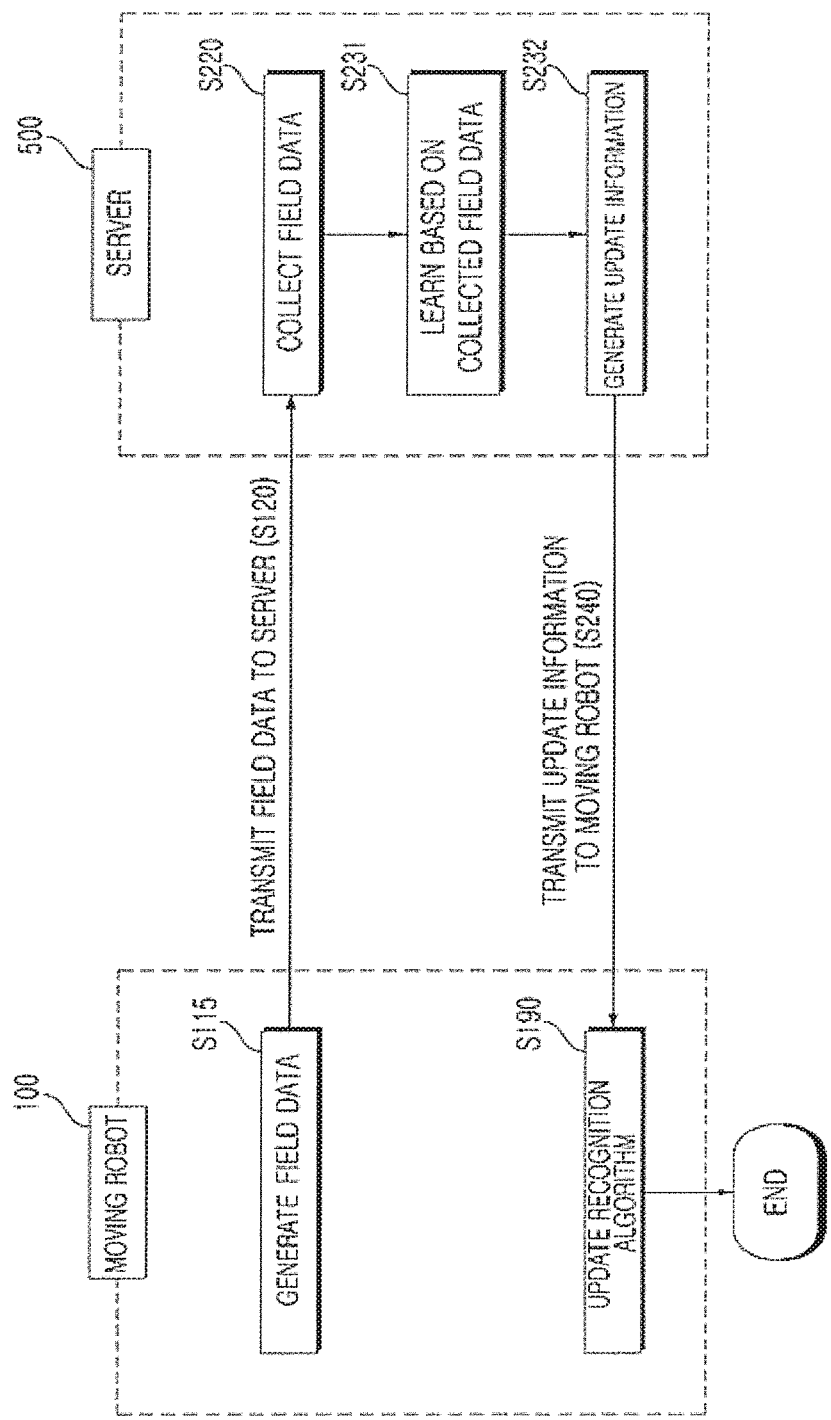
FIG. 9 is a flowchart of the control method according to the first embodiment of the present disclosure, together with a communication operation between a moving robot and a server.

With reference to FIGS. 7 and 9, the travel control operation according to a first embodiment of the present disclosure is as below. The travel control operation is performed by the moving robot 100. In the travel control operation, the moving robot 100 senses information regarding the environment around the moving robot 100 during traveling in operation S110. At the travel control operation, the moving robot 100 generates the field data through sensing by the sensing unit 130 in operation S115. In this case, the field data may be stored in the memory 185. In this case, the moving robot 100 may obtain a recognition result by inputting the field data to a specific recognition algorithm.

At the travel control operation, the moving robot 100 controls autonomous traveling based on a recognition result that is obtained by inputting the field data to the recognition algorithm. For example, when the moving robot 100 recognizes the response-needed situation, autonomous traveling of the moving robot 100 is controlled based on the recognition result in the above-described manner.

Figure 8:
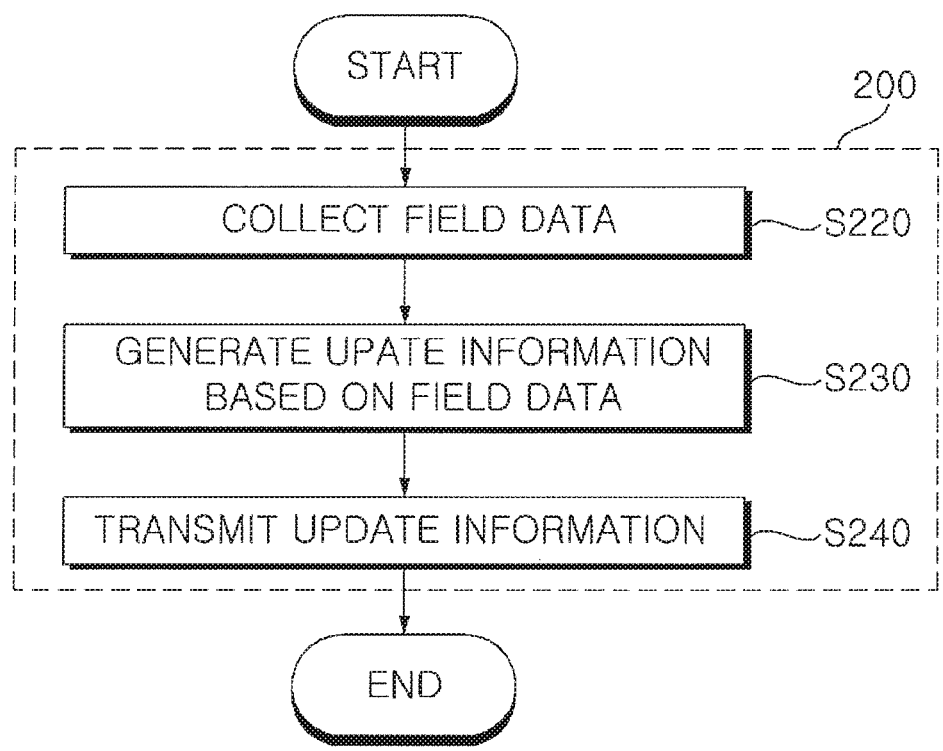
FIG. 8 is a flowchart of a control method of a server according to a first embodiment of the present disclosure.

With reference to FIGS. 8 and 9, the server learning operation according to the first embodiment of the present disclosure is as below. The server learning operation is performed by the server 500. In the server learning operation, the moving robot 100 controls at least some of the generated field data so as to be transmitted to the server 500 in S120. Accordingly, the communication unit 182 transmits at least some of the field data to the server 500 over the network.

In one example, the moving robot 100 may transmit the entire field data to the server 500. In another example, the moving robot 100 may transmit part of the field data to the server 500. At this point, the controller 181 may perform a control operation to select part of the field data and transmit only the selected part to the server 500. The example thereof (a third embodiment) will be described later.

The controller 181 of the moving robot 100 may control the field data to be deleted after being transmitted to the server in operation S120. The field data temporarily stored in the memory 185 is deleted after the above operation S120. In one example, after the moving robot 100 transmits the entire field data to the server 500, the field data stored in the memory 185 is all deleted. In another example, after the moving robot 100 transmits only some of the generated field data to the server 500, the field data stored in the memory 185 is all deleted.

In the server learning operation, the server 500 collects field data generated by the moving robot 100 in operation S220. In the server learning operation, the server 500 receives the field data from the moving robot 100 over a network.

In the server learning operation, the server 500 generates update information in operation S230. The server 500 generates the update information based on the field data transmitted by the moving robot 100. In the server learning operation, the server 500 may learn a recognition algorithm based on the collected field data in operation S231. The server 500 may include a learning engine that learns the recognition algorithm based on the field data. In this case, "learning" by the server may be performed using well-known various "machine learning" techniques.

For example, if there is difference between a recognition result obtained using the field data and the recognition algorithm and the actual value, the update information may be generated. In this case, the update information is generated to reduce the difference between the recognition result and the actual value. In one example, supervised learning may be performed, in which a supervisor guides the actual value to induce learning in a manner that reduces the difference between the recognition result and the actual value. In another example, deep learning may be performed, which enables a computer to identify and determine features.

Meanwhile, the server 500 may perform data mining function on collected field data. The server 500 may analyze the collected field data. The server 500 may generate the update information by learning the recognition algorithm based on the received field data in operation S232. The server 500 may generate the update information through the learning engine. The update information is information for updating the recognition algorithm.

With reference to FIGS. 7 and 9, the update operation according to the first embodiment of the present disclosure is as below. The update operation is performed by the moving robot 100. In the server learning operation, the server 500 transmits the update information to the moving robot 100 over the network.

The server 500 may check the version of a recognition algorithm installed in the moving robot 100, based on specific information received from the moving robot 100. Based on the verified vision, the server 500 may determine whether to transmit the update information to the moving robot 100. In one example, only when the version of a recognition algorithm to be updated based on the update information is higher than the version of the recognition algorithm currently installed in the moving robot 100, the server 500 may transmit the update information to the moving robot 100.

In the update operation, the moving robot 100 receives the update information from the server 500 in operation S180. In the update operation, the moving robot 100 update the recognition algorithm using the update information received from the server 500 in operation S190. The controller 181 may update a recognition algorithm stored in the memory 185 using recognition algorithm update information transmitted from the server 500.

In one example, the update information may include an updated recognition algorithm. The update information may be a recognition algorithm (program) itself, which has been updated. In the server learning operation, the server 500 may update a recognition algorithm, which is pre-stored in the server 500, using collected field data, and, in this case, the recognition algorithm updated by the server 500 may be used as the aforementioned update information. In this case, in the update operation, the moving robot 100 may perform update by replacing the updated recognition algorithm received from the server 500 with a pre-stored recognition algorithm of the moving robot 100.

In another example, the update information may not be a recognition algorithm itself but it may be information that triggers updating of an existing recognition algorithm. In the server learning operation, the server 500 may drive the learning engine using the field data, and accordingly, generate the update information. In this case, in the update operation, the moving robot 100 may perform update by changing the pre-stored recognition algorithm of the moving robot 100 based on the update information received from the server 500.

Figure 10:
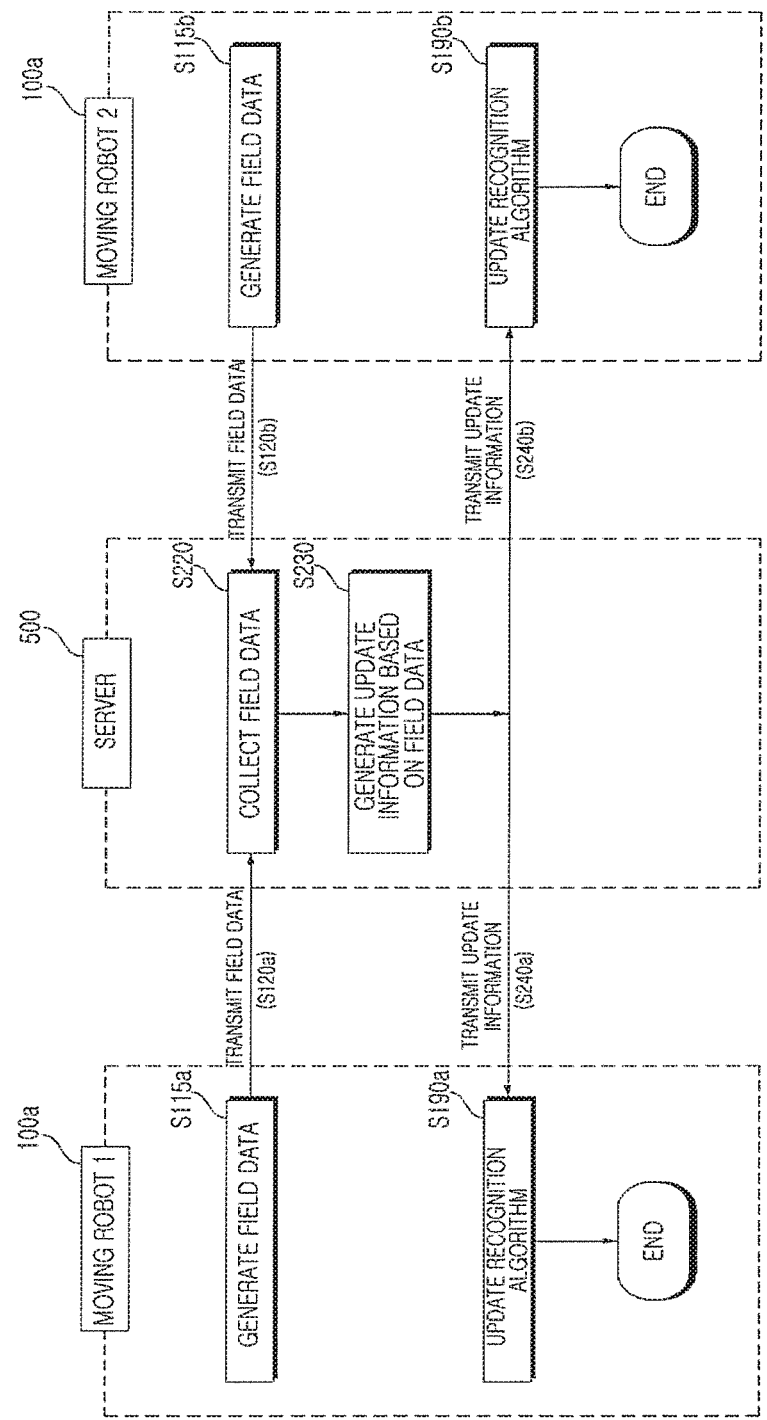
FIG. 10 is a flowchart of a control method according to a second embodiment of the present disclosure, together with a communication operation between a plurality of moving robots and a server.

Hereinafter, a control method of a moving robot and a control system of a moving robot according to a second embodiment of the present disclosure are described with reference to FIG. 10. In the second embodiment, the same components as in the first embodiment are indicated with the same reference numeral and detailed description thereof are herein omitted.

In the second embodiment, there is provided a plurality of moving robots 100a and 100b each transmitting field data to the server 500. FIG. 10 shows an example in which a first moving robot 100a and a second moving robot 100b are provided, but more number of moving robots may be provided.

The first moving robot 100a performs the travel control operation. The first moving robot 100a generates field data in operation S115a. The first moving robot 100a transmits at least some of the generated field data to the server 500 in operation S120a.

The second moving robot 100a performs the travel control operation. In the travel control operation, the second moving robot 100b generates field data in operation S115b. The second moving robot 100b transmits at least some of the generated field data to the server 500 in operation S120b.

In the server learning operation, the server 500 generates update information based on field data received from the plurality of moving robots 100*a* and 100*b*. In the server learning operation, the server 500 collects the field data from the plurality of moving robots 100*a* and 100*b* in operation S220. For example, the server 500 may receive field data from each of the moving robots 100*a* and 100*b* located in different environments.

In the server learning operation, the server 500 may generate the update information based on the collected field data in operation S230. In one example, the server 500 may generate update information based on all field data collected from the plurality of moving robots 100*a* and 100*b* to update the respective recognition algorithms for the plurality of moving robots 100*a* all at once. In this case, the field data generated by the second moving robot 100*b* affects updating of the recognition algorithm of the first moving robot 100*a*.

In another example, the server 500 may separately manage field data generated byte plurality of moving robots 100*a* and 100*b* to generate update information for each of the plurality of moving robots 100*a* and 100*b*. In this case, the field data generated by the first moving robot 100*a* is to be used only as the basis of generating update information for the recognition algorithm of the first moving robot 100*a*, but not as the basis of generating update information for the recognition algorithm of the second moving robot 100*b*.

In the update operation, the server 500 transmits update information to each of the plurality of moving robots 100*a* and 100*b* in operations S240*a* and S240*b*. The server 500 transmits update information to the first moving robot in operation S240*a*. The server 500 transmits update information to the second moving robot in operation S240*b*.

Each of the plurality of moving robots 100*a* and 100*b* updates a recognition algorithm based on received update information in operations S190*a* and S190*b*. The first moving robot 100*a* updates a recognition algorithm based on received update information in operation S190*a*. The second moving robot 100*b* updates a recognition algorithm based on received update information in operation S190*b*.

Figure 11:
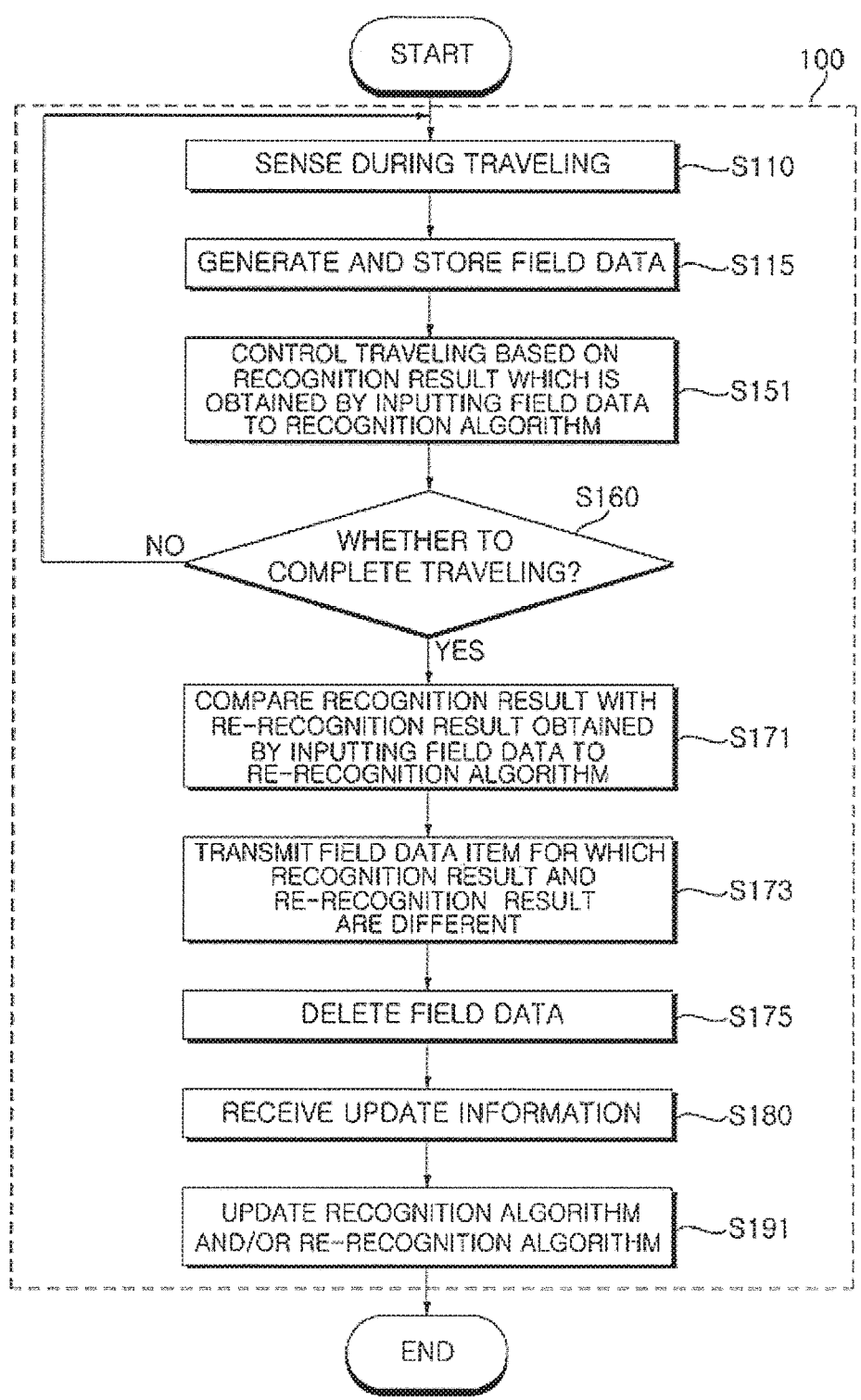
FIG. 11 is a flowchart of a control method of a moving robot according to a third embodiment of the present disclosure.

Hereinafter, a control method of a moving robot and a control system of a moving robot according to a third embodiment of the present disclosure is described with reference to FIGS. 11 to 13. In the third embodiment, the same components as in the first embodiment are indicated with the same reference numeral and detailed description thereof are herein omitted.

In the third embodiment, the moving robot 100 selects some of generated field data and transmits the selected data to the server 500. The moving robot 100 makes a determination to figure out which field data item is subject to be transmitted, and then transmits, to the server 500, only a field data subject to be transmitted. The mobile robot 100 may determine that field data greatly helping learning of the server 500 is a subject to be transmitted. To this end, a recognition algorithm and a specific re-recognition algorithm, which is preset apart from the recognition algorithm, are installed in the moving robot 100. If an outcome value (recognition result) of the recognition algorithm of the recognition algorithm and an outcome value (re-recognition result) of the re-recognition algorithm are different for the same input value (field data), it is determined that at least one of the recognition algorithm and the re-recognition algorithm needs to be updated. Accordingly, the moving robot 100 transmits an input value (field data), in which there is difference between the recognition result and the re-recognition result, to the server 500, and then the server 500 performs learning of at least one of the recognition algorithm and the re-recognition algorithm based on the input value (field data).

In the travel control operation according to the third embodiment, the moving robot 100 performs sensing using the sensing unit 130 during traveling in operation S110, and then generate field data and stores the field data in the memory 185 in operation S115. The moving robot 100 generates a plurality of field data items A1, A2, A3, ..., Ap in operation S115 (wherein Ap is a natural number equal to or greater than 2). In the travel control operation, the moving robot 100 controls traveling based on a recognition result that is obtained by inputting the generated field data items to the recognition algorithm installed in the moving robot 100 in operation S151.

The travel control operation may further include operation S160 in which the moving robot 100 determines whether to finish traveling. In operation S160, the moving robot 100 may determine whether a specific condition preset to complete traveling is satisfied. In one example, the specific condition includes a condition in which an amount of charged power of the moving robot 100 is equal to or less than a specific level. In another example, the specific condition may include a condition in which the moving robot 100 completes a preset travel course.

If it is determined in operation S160 that traveling is not complete, the travel control operation may continue. If it is determined in operation S160 that traveling is complete, a verification operation which will be described later may start.

The control method according to the third embodiment includes a verification operation S171 in which the moving robot 100 compares a re-recognition result, which is obtained by inputting the field data to a specific re-recognition algorithm, with the recognition result. In the verification operation S171, it may be determined as to whether there is difference between the recognition result and the re-recognition result.

The "re-recognition algorithm" is preset apart from the recognition algorithm. The re-recognition algorithm is an algorithm for outputting a re-recognition result that cab be compared with a recognition result for the same field data item. The re-recognition algorithm may be used, instead of the recognition algorithm, to recognize a situation of the moving robot 100, but, in this embodiment, the re-recognition algorithm is used to see if there is difference between the re-recognition result and the recognition result.

The re-recognition algorithm may be preset to be a higher-performance and more highly-precise algorithm than the recognition algorithm. The re-recognition algorithm may have a memory capacity greater than that of the recognition algorithm. Outputting a recognition result from implementation of the recognition algorithm may be preset to take a shorter time than outputting a re-recognition result from implantation of the re-recognition algorithm. It is desirable that the verification operation S171 is proceeded with after the travel control operation. Accordingly, autonomous travel of the moving robot 100 is controlled using the recognition algorithm which is less precise but requires short processing time, thereby making it possible to quickly respond to a problem occurring during traveling. In addition, using the re-recognition algorithm which is highly precise, it is possible to efficiently select data to be used as the basis for update of the recognition algorithm. Furthermore, the re-recognition algorithm which takes a long time is proceeded with after the travel control operation, and thus, it may not disrupt a quick responding process for traveling control.

Referring to FIG. 12, by inputting each field data item Ai D11 to a recognition algorithm D13, a recognition result Bi D15 may be obtained for a corresponding field data item Ai. In addition, by inputting each field data item Ai D21 to a re-recognition algorithm D23, a re-recognition result Ci D25 may be obtained for a field data item A1. In this case, i=1, 2, 3, ... p, wherein P is a natural number equal to or greater than 2. For example, a recognition result B2 may be obtained by inputting a field data item A2 to a recognition algorithm, and a re-recognition result C2 may be obtained by inputting the field data item A2 to a re-recognition algorithm.

By inputting the field data to the re-recognition algorithm after traveling is complete, the controller 181 may obtain the re-recognition result. The controller 181 may compare a re-recognition result Ci, which is obtained by inputting the field data to a specific re-recognition algorithm, with the recognition result Bi.

The controller 181 performs a control action so as to selectively transmit field data to the server 500, based on whether the recognition result Bi and the re-recognition result Ci are different. The moving robot 100 may transmit a field data item A1, for which the recognition result Bi and the re-recognition result Ci are different, to the server 500 in operation S173. For example, if a recognition result B2 and a re-recognition result C2 are different, a field data item A2 is transmitted from the moving robot 100 to the server 500. If a recognition result B3 and a re-recognition result C3 are identical, a field data item A3 is not transmitted from the moving robot 100 to the server 500. In doing so, the moving robot 100 may selectively transmit a field data item significant for a learning operation of the server 500 to the server 500.

After selectively transmitting field data to the server 500 in operation S173, the moving robot 100 may delete pre-stored field data in operation S175. The moving robot 100 may delete a field data item Ai for which the recognition result Bi and the re-recognition result Ci are different. After transmitting the field data item Ai, for which the recognition result Bi and the re-recognition result Ci are different, to the server 500, the moving robot 100 may delete the field data item Ai.

Referring to FIG. 13, how to select which field data item from a plurality of field data items is subject to be transmitted to the server 500 will be described in more details. After operation S115, it is determined in operation S171b whether a recognition result Bi and a re-recognition result are different for each field data item Ai. In this case, i indicates a random natural number between 1 and p, and p is natural number equal to or greater than 2, determined according to the field data. If it is determined in operation S171b that the recognition result Bi and the re-recognition result Ci are different, the corresponding field data item Ai is determined subject to be transmitted in operation S172a. If it is determined in operation S171b that the recognition result Bi and the re-recognition result Ci are not different, the corresponding field data item Ai is determined not subject to be transmitted in operation S172b.

Before the initial operation S171b, 1 is input as a value of i in operation S171a to specify the field data item A1. For example, it is determined in operation S171b whether a recognition result B1 and a re-recognition result C1 are different for the field data item A1 is determined, and, depending on the result of operation S171b, it is determined whether or not the field data item A1 is subject to be transmitted is determined.

After operation S171b, operation S171c of determining whether or not a value of i is p is performed. If it is determined in operation S171c that the value of i is not p, operation S171d is performed in which 1 is added to the exiting value of i into a new value of i. After operation S171d, operation S171b is performed again. If it is determined, in operation S171c, that the value of i is p, which field data item is subject to be transmitted is determined with respect to every field data item, and thus, selecting a field data item is completed.

In the server learning operation according to the third embodiment, the server 500 may generate update information to update at least one of a recognition algorithm and a re-recognition algorithm using collected field data. In one example, a learning engine in the server 500 may learn the recognition algorithm based on the collected field data. In another example, a learning engine in the server 500 may learn the re-recognition algorithm based on the collected field data. In yet another example, a learning engine in the server 500 may learn the recognition algorithm and the re-recognition algorithm based on the collected field data.

In the update operation according to the third embodiment, the moving robot 100 receives the update information from the server 500 in operation S180. In the update operation, the controller 181 of the moving robot 100 updates at least one of the recognition algorithm and the re-recognition algorithm using the received update information in operation S191. Specifically, using the update information, the moving robot 100 may update the recognition algorithm, the re-recognition algorithm, or both of the recognition algorithm and the re-recognition algorithm.

A moving robot recognizes an environment, such as a nearby obstacle, solely based on a pre-stored algorithm. However, in an exceptional situation in which a new type of obstacle shows up, it is difficult to recognize such situation using the pre-stored algorithm, and accordingly, a wrong traveling operation is performed, thereby causing inconvenience to a user. Aspects of the present disclosure address this issue.

Other aspects of the present disclosure efficiently collect field data of an environment around a moving robot and precisely and broadly perform learning on the collected field data.

When it comes to machine learning, data generated by a certain moving robot is used only for learning of the corresponding moving robot, and thus, other moving robots needs to perform redundant learning. That is, the plurality of moving robots needs to make adaptive efforts (learning efforts) to adapt to an ambient environment. Aspects of the present disclosure to address this issue.

In certain aspects, in the case of transmitting field data, which is generated by a moving robot as a means for the second objective, to a server, if all the generated field data is transmitted to the server, it may increase the burden on transmission and reception of data and a learning process. Other aspects of the present disclosure address this issue.

In addition, if a user selectively transmits field data, generated by a moving robot, in order to achieve the second and fourth objectives, the data may be too bothersome to use. Other aspects of the present disclosure address this issue.

In certain aspects, the present disclosure provides a solution for efficiently implementing a machine learning function, without being limited to the initial performance designed by an developer or a user.

In certain aspects, the present disclosure provides a solution in which a moving robot generates data necessary for learning (field data) and a server learns a recognition algorithm of the moving robot based on the field data.

In certain aspects, the present disclosure provides a solution in which a server performs learning based on field data received from a plurality of moving robots.

In certain aspects, the present disclosure provides a solution in which a moving robot selectively transmit field data to a server.

In one general aspect, there is provided a moving robot including: a main body; a driving unit configured to move the main body; a sensing unit configured to sense information regarding an environment around the main body during traveling so as to generate field data; a communication unit configured to communicate with a server over a specific network; and a controller configured to control autonomous traveling based on a recognition result obtained by inputting the field data to a specific recognition algorithm, control some of the field data so as to be transmitted to the server, and to update the recognition algorithm using update information received from the server.

The moving robot may further include a memory configured to store the generated field data. The controller may be further configured to control the field data so as to be deleted after being transmitted to the server.

The controller may be further configured to perform a control action so as to select only some of the field data and transmit the selected field data to the server. The controller may be further configured to: compare a re-recognition result, obtained by inputting the field data to a specific re-recognition algorithm, with the recognition result; and selectively transmit the field data to the server based on whether the recognition result and the re-recognition result are different.

The controller may be further configured to obtain the re-recognition result by inputting the field data to the re-recognition algorithm after traveling is completed. The controller may be further configured to control a field data item, for which the recognition result and the re-recognition result are different, so as to be transmitted to the server.

In another general aspect of the present disclosure, there is provided a control method of a moving robot, the method including: a travel control operation in which the moving robot generates field data by sensing information regarding an environment around the moving robot, and controls autonomous traveling based on a recognition result that is obtained by inputting the field data to a recognition algorithm stored in the moving robot; a server learning operation in which the moving robot transmits at least some of the field data to a server and the server generates update information based on the field data transmitted by the moving robot; and an update operation in which the server transmits the update information to the moving robot. In the update operation, the moving robot may update the recognition algorithm using the update information.

The method may further include, after the travel control operation, a verification operation in which the moving robot compares a re-recognition result, obtained by inputting the field data to a specific re-recognition algorithm, with the recognition result. In the server learning operation, the moving robot may selectively transmit the field data based on whether the recognition result and the re-recognition result are different.

The verification operation may be performed after traveling of the moving robot is completed. Outputting a recognition result from implementation of the recognition algorithm may be preset to take a shorter time than outputting a re-recognition result from implementation of the re-recognition algorithm.

In the server learning operation, the moving robot may transmit a field data item, for which the recognition result and the re-recognition result are different, to the server. In the update operation, the moving robot may update at least one of the recognition algorithm and the re-recognition algorithm using the received update information.

In the server learning operation, the server may generate the update information by learning the recognition algorithm based on the received field data.

The update information may include an updated recognition algorithm. In the update operation, the moving robot may perform update by replacing the updated recognition algorithm received from the server with a recognition algorithm pre-stored in the moving robot.

In the server learning operation, the server may generate the update information based on the field data received from a plurality of moving robots.

In yet another general aspect of the present disclosure, there is provided a control system of a moving robot, the system including: a moving robot; and a server configured to communicate with the moving robot over a specific network. The moving robot may generate field data by sensing information regarding an environment around the moving robot during traveling, control autonomous traveling based on a recognition result obtained by inputting the field data to a recognition algorithm stored in the moving robot, and transmit at least some of the field data to the server. The server may generate update information based on the field data and transmit the generated update information to the moving robot.

The moving robot may update the recognition algorithm using the update information. The moving robot may compare a re-recognition result, obtained by inputting the field data to a specific re-recognition algorithm with the recognition result, selectively transmit the field data based on whether the recognition result and the re-recognition result are different, and update at least one of the recognition algorithm and the re-recognition algorithm using the update information.

A control system of the moving robot may include a plurality of moving robots. The server generates may generate update information based on field data received from the plurality of moving robot. Accordingly, the moving robot may update a recognition algorithm so as to efficiently increase the rate of recognition of an ambient environment and reduce the rate of erroneous recognition.

By generating field data and performing learning based on the field data, the moving robot may learn a recognition algorithm based on information about an environment around the moving robot while performing learning more efficiently through server-based learning.

By collecting field data from the plurality of moving robots, the server is able to learn a recognition algorithm based on various environments and it may take less time for the plurality of moving robots to perform redundant learning.

After being transmitted to the server, the field data may be deleted from the memory of the moving robot, thereby reducing the burden on a memory capacity of the moving robot. As only some of the field data is selectively transmitted to the server, the burden on transmission and reception of data and a learning process by the server may be relieved and the server may be able to perform learning more efficiently.

As a field data item subject to be transmitted is selected based on whether an outcome value of the recognition algorithm and an outcome value of the re-recognition algorithm are different, the moving robot may be able to select a field data item more significant for learning of the server.

As a re-recognition result is obtained using the re-recognition algorithm after completion of traveling, it is possible to reduce the burden on data processing during traveling and to efficiently select field data. In addition, outputting a recognition result from implementation of the recognition algorithm is preset to take a shorter time than outputting a re-recognition result from implementation of the re-recognition algorithm. Therefore, autonomous traveling of a moving robot may be controlled using the recognition algorithm which is less precise but processes data fast, and the re-recognition algorithm may be used to obtain the re-recognition result to be compared with the recognition result.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described herein with reference to cross-section illustrations that are schematic illustrations of idealized embodiments (and intermediate structures) of the present disclosure. As such, variations from the shapes of the illustrations as a result, for example, of manufacturing techniques and/or tolerances, are to be expected. Thus, embodiments of the present disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the present disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the present disclosure, the drawings and the appended claims. In addition to variations and modifications in the component parts and/or arrangements, alternative uses will also be apparent to those skilled in the art.

What is claimed is:

1. A moving robot comprising:
   a main body;
   a motor to move the main body;
   a sensor to collect information regarding an environment around the main body so as to generate field data;
   a communication interface to communicate with a computer over a network; and
   a controller to:
      manage the motor for autonomous traveling of the moving robot based on a recognition result obtained by processing the field data using a recognition algorithm,
      transmit, via the communication interface, at least a portion of the field data to the computer, and
      update the recognition algorithm using update information received from the computer,
   wherein the controller further configured to:
      compare a re-recognition result, obtained by inputting the field data to a re-recognition algorithm that differs from the recognition algorithm, with the recognition result; and
      determine to selectively transmit at least the portion of the field data to the computer based on whether the recognition result and the re-recognition result are different.

2. The moving robot according to claim 1, further comprising:
   a memory to store the field data, wherein the controller is further configured to control the memory to delete at least some of the field data after transmitting the portion of the field data to the computer.

3. The moving robot according to claim 1, wherein the controller is further to obtain the re-recognition result by inputting the field data to the re-recognition algorithm after the moving robot completes traveling.

4. The moving robot according to claim 1, wherein the controller is further configured to control a portion of the field data related to an obstacle, for which the recognition result and the re-recognition result are different, to be transmitted to the computer.

5. A method of controlling a moving robot, the method comprising:
   sensing, by the moving robot, information regarding an environment around the moving robot to generate field data;
   controlling, by the moving robot, an autonomous traveling of the moving robot based on a recognition result that is obtained by processing the field data using a recognition algorithm for the moving robot;
   transmitting, by the moving robot, at least some of the field data to a computer that generates update information based on the field data; and
   obtaining, by the moving robot, the update information,
   wherein the moving robot compares a re-recognition result, obtained by processing the field data using a re-recognition algorithm that differs from the recognition algorithm, with the recognition result, selectively transmits the portion of the field data based on whether the recognition result and the re-recognition result are different, and updates at least one of the recognition algorithm and the re-recognition algorithm using the update information received from the computer.

6. The method according to claim 5, further comprising:
   updating, by the moving robot, the recognition algorithm using the update information.

7. The method according to claim 5, wherein the moving robot determines whether to transmit the field data after the autonomous traveling of the moving robot is completed.

8. The method according to claim 5, wherein the recognition algorithm enables the moving robot to generate the recognition result in a first time that is relatively shorter that a second time used by the moving robot to generate the re-recognition result using the re-recognition algorithm.

9. The method according to claim 5, wherein the portion of the field data transmitted to the computer relates to an obstacle, for which the recognition result and the re-recognition result are different.

10. The method according to claim 5, wherein the moving robot updates at least one of the recognition algorithm or the re-recognition algorithm based on the update information.

11. The method according to claim 5, wherein the computer forms an updated recognition algorithm based on the field data received from the moving robot and generates the update information based on the updated recognition algorithm.

12. The method according to claim 5,
   wherein the update information includes information associate with an updated recognition algorithm, and
   wherein the moving robot replaces the recognition algorithm with the updated recognition algorithm received from the computer.

13. The method according to claim 5, wherein the computer generates the update information based on field data received from a plurality of moving robots.

14. A system comprising:
   a moving robot; and
   a computer configured to communicate with the moving robot over a network,
   wherein the moving robot generates field data based on sensed information regarding an environment around the moving robot, controls autonomous traveling of the moving robot based on a recognition result obtained by inputting the field data to a recognition algorithm, and transmits at least some of the field data to the computer via the network,
   wherein the computer generates update information based on the portion of the field data received from the moving robot and transmits the update information to the moving robot via the network, and
   wherein the moving robot compares a re-recognition result, obtained by processing the field data using a re-recognition algorithm that differs from the recognition algorithm, with the recognition result, selectively transmits the portion of the field data based on whether the recognition result and the re-recognition result are different, and updates at least one of the recognition algorithm and the re-recognition algorithm using the update information received from the computer.

15. The system according to claim 14, wherein the moving robot further updates the recognition algorithm using the update information.

16. The system according to claim 14,
   wherein the computer generates update information based on field data received from a plurality of moving robot.

* * * * *